(12) United States Patent
Nakamura et al.

(10) Patent No.: US 11,559,867 B2
(45) Date of Patent: Jan. 24, 2023

(54) MOTOR CONTROL DEVICE AND INDUSTRIAL MACHINE FOR SUPPRESSING VIBRATION

(71) Applicant: Fanuc Corporation, Yamanashi (JP)

(72) Inventors: Tsutomu Nakamura, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 27 days.

(21) Appl. No.: 16/891,768

(22) Filed: Jun. 3, 2020

(65) Prior Publication Data

US 2020/0384593 A1    Dec. 10, 2020

(30) Foreign Application Priority Data

Jun. 5, 2019 (JP) .............. JP2019-105568

(51) Int. Cl.
*B23Q 17/12* (2006.01)
*B23Q 5/10* (2006.01)
*G06F 17/11* (2006.01)
*B23Q 17/09* (2006.01)
*G05B 19/18* (2006.01)

(52) U.S. Cl.
CPC ........... *B23Q 17/12* (2013.01); *B23Q 5/10* (2013.01); *B23Q 17/0961* (2013.01); *B23Q 17/0971* (2013.01); *G05B 19/182* (2013.01); *B23Q 2705/104* (2013.01); *B23Q 2705/145* (2013.01); *B23Q 2717/006* (2013.01); *G06F 17/11* (2013.01)

(58) Field of Classification Search
CPC ........... B23Q 17/12; B23Q 17/0961; B23Q 17/0971; B23Q 17/0976; B23Q 5/10; B23Q 2705/104; B23Q 2705/145; B23Q 2717/006; G06F 17/11; G05B 19/182

See application file for complete search history.

(56) References Cited

U.S. PATENT DOCUMENTS

| | | | | |
|---|---|---|---|---|
| 2003/0184251 A1* | 10/2003 | Oyama | ............... | G05B 13/042 318/607 |
| 2004/0085035 A1* | 5/2004 | Tazawa | ................... | H02P 6/06 318/432 |
| 2004/0135536 A1* | 7/2004 | Iwashita | ............... | G05B 19/39 318/652 |
| 2008/0001567 A1* | 1/2008 | Iwashita | ............... | F16F 15/002 318/652 |

(Continued)

FOREIGN PATENT DOCUMENTS

| | | |
|---|---|---|
| JP | 2006158026 A | 6/2006 |
| JP | 2017138821 A | 8/2017 |

(Continued)

*Primary Examiner* — Mohamed Charioui
(74) *Attorney, Agent, or Firm* — RatnerPrestia (57) ABSTRACT

A motor control device includes an acceleration detecting section configured to detect an acceleration of a control object, and an acceleration control section configured to control an acceleration of a motor driving the control object based on the detected acceleration, in which the acceleration control section includes a vibration component extraction filter configured to extract a vibration component generated between the motor and the control object, and the vibration component extraction filter changes a filter characteristic frequency according to at least one of a position and a mass of the control object.

11 Claims, 6 Drawing Sheets

(56) References Cited

U.S. PATENT DOCUMENTS

2009/0009128 A1* 1/2009 Okita .................. G05B 13/024
                                                                             318/619
2012/0187891 A1    7/2012 Ueda et al.
2012/0215355 A1* 8/2012 Bewley ................ B62D 55/075
                                                                             700/258

FOREIGN PATENT DOCUMENTS

| WO | 2011039929 A1 | 4/2011 |
|---|---|---|
| WO | 2015136696 A1 | 9/2015 |

* cited by examiner

MOTOR CONTROL DEVICE AND INDUSTRIAL MACHINE FOR SUPPRESSING VIBRATION

CROSS-REFERENCE TO RELATED APPLICATIONS

This application is a new U.S. Patent Application that claims benefit of Japanese Patent Application No. 2019-105568, dated Jun. 5, 2019, the disclosure of this application is being incorporated herein by reference in its entirety for all purposes.

BACKGROUND OF THE INVENTION

1. Field of the Invention

The present invention relates to a motor control device and an industrial machine, and more particularly to a motor control device and an industrial machine for suppressing vibration.

2. Description of the Related Art

When a workpiece is machined using a machine tool that generates low frequency vibration, for example, vibration in a frequency band of 100 Hz or less, it has been a problem that stripes are formed on the workpiece in response to the vibration. The following documents are known as techniques for suppressing such vibrations.

JP 2017-138821 A discloses a vibration suppression device including: a torque command output section that outputs a torque command based on a movement command to a motor; a torque command generating means that generates a compensation torque command corresponding to a vibration having a phase opposite to that of vibration generated in a mechanical device driven by the motor; and an adding means that adds the output torque command and the generated compensation torque command.

WO 2015/136696 discloses a method of controlling a feed shaft of a machine tool, in which an acceleration is acquired based on an output signal of a state sensor attached to at least one of a machine structure and a shaft feed mechanism, and an acceleration feedback signal obtained by multiplying the acquired acceleration by a predetermined first gain is subtracted from a torque command output from a speed control section.

WO 2011/039929 discloses a positioning control device, in which an amplitude value of a residual vibration of a machine is predicted based on the operating conditions and the information of the residual vibration before performing positioning, and then based on the prediction result, a selection is automatically performed between a first servo control section that performs positioning control without considering the suppression of the residual vibration of the machine, and a second servo control section that considers the suppression of the residual vibration of the machine.

JP 2006-158026 A discloses a control device for controlling the driving of a servo motor, which includes an acceleration detection means for detecting the acceleration of a driven body, and executes correction processing in a speed control processing period longer than a current control processing period by correcting a speed command using an acceleration detection value detected by the acceleration detection means, thereby reducing the processing time required for correction.

SUMMARY OF THE INVENTION

In the related method of suppressing vibration, a change of the vibration suppression function with respect to a change of the vibration characteristic is likely to be delayed, and the component other than the target vibration component is also likely to be suppressed, so that the motor control may become unstable.

Therefore, there is a need for a technique for more quickly and more accurately adapting a vibration suppression function to a change in a vibration characteristic.

One aspect of the present disclosure provides a motor control device including: an acceleration detecting section configured to detect an acceleration of a control object; and an acceleration control section configured to control an acceleration of a motor driving the control object based on the detected acceleration, in which the acceleration control section includes a vibration component extraction filter configured to extract a vibration component generated between the motor and the control object, and the vibration component extraction filter changes a filter characteristic frequency according to at least one of a position and a mass of the control object.

Another aspect of the present disclosure provides an industrial machine including a motor, an own shaft driven by the motor, a control object movable by the own shaft, and the motor control device described above.

Another aspect of the present disclosure provides an industrial machine including a motor, an own shaft driven by the motor, another shaft driven by a motor different from the motor, a control object movable by at least one of the own shaft and the other shaft, and the motor control device described above.

DETAILED DESCRIPTION

Embodiments of the present disclosure will be described in detail below with reference to the accompanying drawings. In each drawing, the same or similar components are denoted by the same or similar reference numerals. Additionally, the embodiments described below are not intended to limit the technical scope of the invention or the meaning of terms set forth in the claims.

Figure 1:
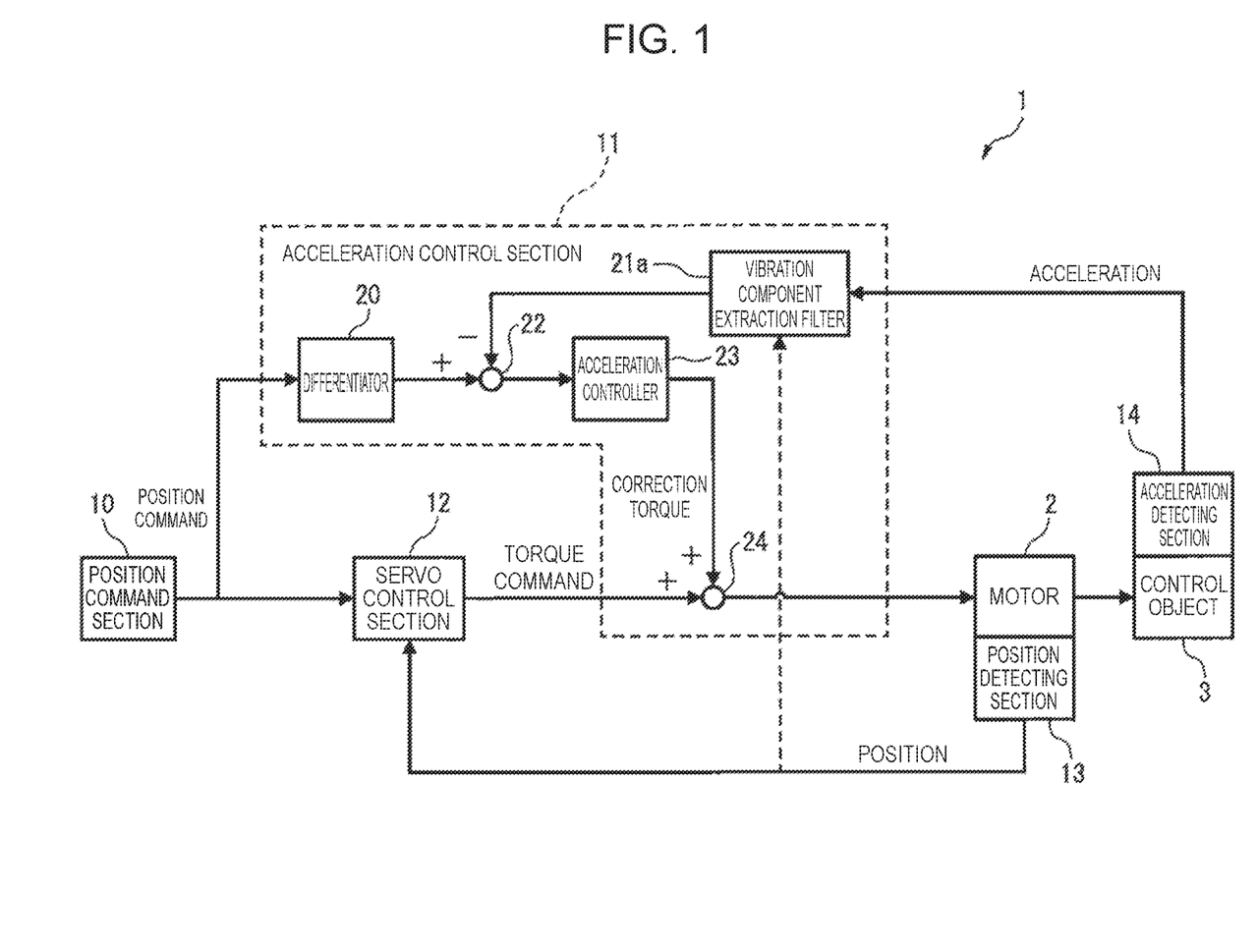
FIG. 1 is a configuration diagram of a motor control device according to one embodiment.

FIG. 1 illustrates a configuration of a motor control device 1 according to the present embodiment. The motor control device 1 includes a position command section 10 that generates a position command for the control object 3, a position detecting section 13 that detects a position of a motor 2, and a servo control section 12 that controls the motor 2 based on the generated position command and the detected position of the motor. A control object 3 includes, for example, a table, a main spindle head, a conveyor or the like of an industrial machine such as a machine tool and a transport machine. The position detecting section 13 includes a rotational displacement sensor directly attached to the motor such as an encoder, a resolver, and a Hall sensor. The servo control section 12 performs a feedback control of at least one of a position, a speed, and a torque of the motor 2.

The motor control device 1 according to the present example further includes an acceleration detecting section 14 that detects an acceleration of the control object 3, and an acceleration control section 11 that controls acceleration of the motor 2 based on the detected acceleration. The acceleration detecting section 14 includes an acceleration sensor of, for example, a piezoelectric type, a piezoresistance type, or a capacitance type, and is attached to an industrial machine. The acceleration control section 11 includes a differentiator 20, a vibration component extraction filter 21a, a subtractor 22, an acceleration controller 23, and an adder 24. The acceleration control section 11 may include a processor such as a central processing unit (CPU) and a field-programmable gate array (FPGA).

The differentiator 20 differentiates twice the position command generated by the position command section 10 to generate an acceleration command. However, the differentiator 20 may generate an acceleration command by differentiating once the speed command generated by the servo control section 12. The vibration component extraction filter 21a is an acceleration feedback filter provided downstream from the acceleration detecting section 14, and extracts an acceleration including a vibration component from the acceleration detected by the acceleration detecting section 14. The subtractor 22 subtracts the acceleration including the vibration component extracted by the vibration component extraction filter 21a from the acceleration command generated by the differentiator 20 to generate an acceleration deviation. The acceleration controller 23 performs at least one of a proportional control (P), an integral control (I) and a differential control (D) based on the acceleration deviation to generate a correction torque. However, instead of the correction torque, the acceleration controller 23 may generate a correction position, a correction speed or the like to output them to the servo control section 12. The adder 24 adds the correction torque and the torque command generated by the servo control section 12 to output the result to the motor 2. However, the adder 24 may add the correction position and the position command, or may add the correction speed and the speed command. As described above, the motor control device 1 performs a motor control in which a vibration of the control object 3 is suppressed.

Figure 2:
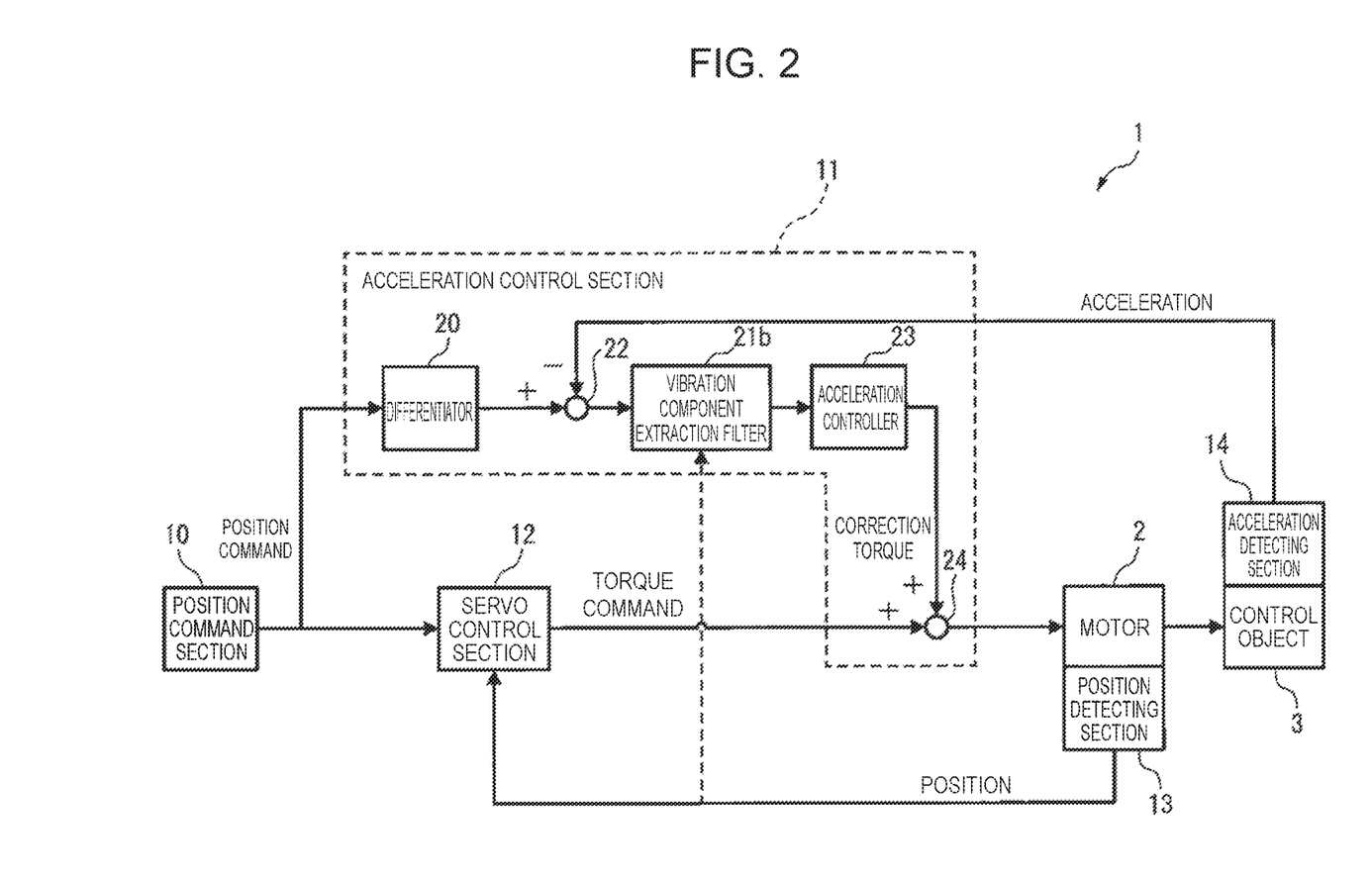
FIG. 2 is a configuration diagram of a motor control device according to another embodiment.

FIG. 2 illustrates a configuration of a motor control device 1 according to another embodiment. A vibration component extraction filter 21b of the present example is an acceleration deviation filter provided upstream from the acceleration controller 23, and differs from the vibration component extraction filter 21a described above in that the acceleration deviation including the vibration component is extracted. However, the vibration component extraction filter 21b may be a correction torque filter provided downstream from the acceleration controller 23, and in this case, extracts a correction torque including a vibration component. As a result, the motor control device 1 performs motor control in which vibration of the control object 3 is suppressed.

Either of the vibration component extraction filters 21a and 21b described above preferably includes at least one of filters that pass a specific frequency component, such as a low-pass filter and a band-pass filter. When each of the vibration component extraction filters 21a and 21b includes a plurality of filters, these filters may be arranged in series or in parallel. Further, the filter characteristic frequency $\omega_0$ of each of the vibration component extraction filters 21a and 21b is changed according to the vibration frequencies $\omega_1$ and $\omega_2$ of the control object 3, as described later. The filter characteristic frequency $\omega_0$ is, for example, a cut-off frequency in a low-pass filter, or a center frequency or an upper cut-off frequency and a lower cut-off frequency in a band-pass filter. The band-pass filter may pass a specific frequency band using a half-width.

In general, an industrial machine transmits power to the control object 3 via a power transmission element such as a shaft, a gear, a belt, a chain, a cam, a link, or the like. Accordingly, the vibration frequency of the control object 3 can be represented by the torsional vibration characteristic, the plate spring vibration characteristic, of the power transmission element, and combinations thereof, or the like.

Figure 3A:
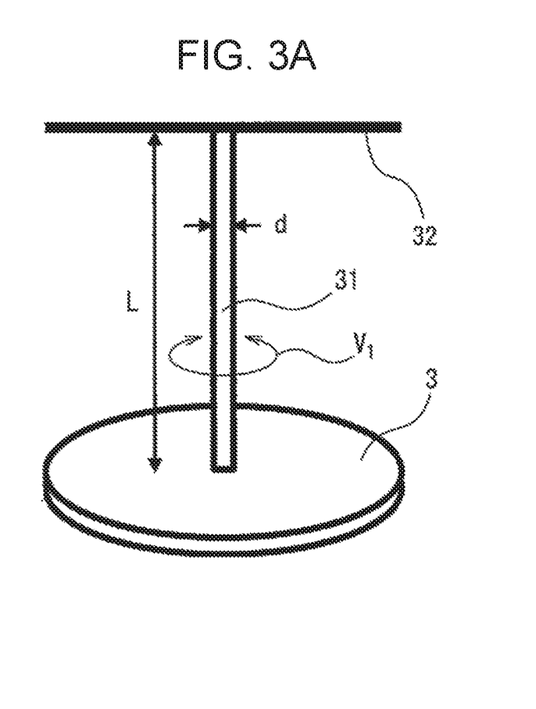
FIG. 3A is an explanatory diagram illustrating a torsional vibration characteristic of a ball screw.
Figure 3B:
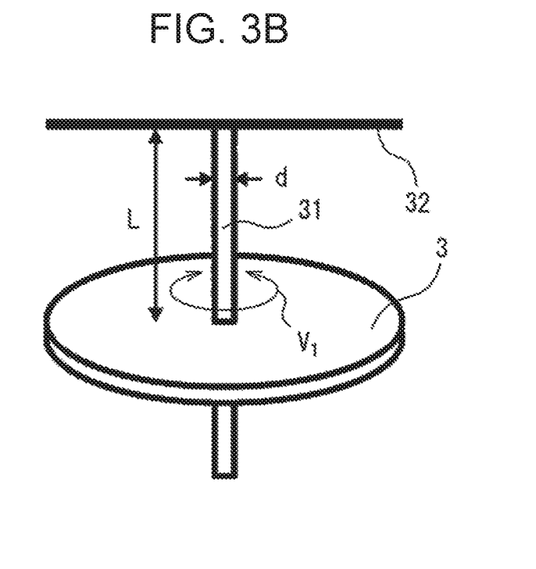
FIG. 3B is an explanatory diagram illustrating a torsional vibration characteristic of a ball screw.

As an example of the torsional vibration characteristic, the torsional vibration characteristic of a ball screw 31 will be described with reference to FIGS. 3A and 3B. In this example, it is assumed that the control object 3 as a table moves on the ball screw 31, the ball screw 31 is supported by the support element 32 in a cantilever manner, and the ball screw 31 generates a torsional vibration $V_1$. When the ball screw 31 has a length L, a diameter d, and a transverse elastic modulus G, and its mass can be ignored, the spring constant $k_1$ of the ball screw 31 is represented by the equation below:

$$k_1 = \frac{\pi d^4 G}{32L} \quad \text{Equation 1}$$

As can be seen from this equation, the spring constant $k_1$ changes depending on the length L, of the ball screw, equivalent to the position of the control object 3. As the position L of the control object 3 changes as illustrated in FIG. 3B and the spring constant $k_1$ changes, the angular frequency $\omega_1$ (i.e., the vibration frequency) of the control object 3 also changes as in the following equation. In the following equation, $J_L$ is an inertia of the control object 3.

$$\omega_1 = \sqrt{k_1/J_L} \quad \text{Equation 2}$$

According to this equation, it is also understood that the angular frequency $\omega_1$ of the control object 3 changes according to the inertia $J_L$ equivalent to a mass M of the control object 3. When the control object 3 has the mass M and is driven by the ball screw 31 with the pitch p [m], the inertia $J_L$ of the control object 3 can be converted into the mass M of the control object 3 by the following equation.

$$J_L = \left(\frac{p}{2\pi}\right)^2 \times M \quad \text{Equation 3}$$

Figure 4:
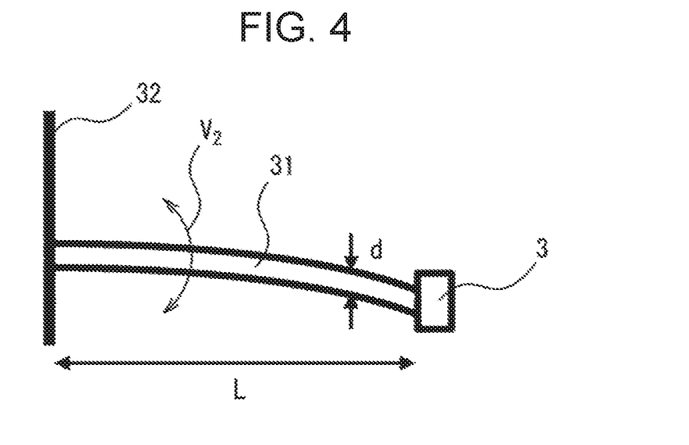
FIG. 4 is an explanatory diagram illustrating a plate spring vibration characteristic of a ball screw.

Further, as an example of the plate spring vibration characteristic, the plate spring vibration characteristic of the ball screw 31 will be described with reference to FIG. 4. In this example, it is assumed that the control object 3 is at the tip of the ball screw 31, the ball screw 31 is supported by the support element 32 in a cantilever manner, and the ball screw 31 generates a plate spring vibration $V_2$. When the ball screw 31 has a length L, a diameter d, and a Young's modulus E, and its mass can be ignored, a spring constant $k_2$ of the ball screw 31 is represented by the equation below:

$$k_2 = \frac{d^4 E}{4L^3} \quad \text{Equation 4}$$

As can be seen from this equation, the spring constant $k_2$ changes depending on the length L, of the ball screw 31, equivalent to the position of the control object 3. As the position L of the control object 3 changes and the spring constant $k_2$ changes, the angular frequency $\omega_2$ (i.e., the vibration frequency) of the control object 3 also changes as in the following equation. In the following equation, M is the mass of the control object 3.

$$\omega_2 = \sqrt{k_2/M} \quad \text{Equation 5}$$

According to this equation, it is also understood that the angular frequency $\omega_2$ of the control object 3 changes according to the mass M of the control object 3. According to the above, the filter characteristic frequency $\omega_0$ of each of the vibration component extraction filters 21a and 21b is preferably changed based on a physical change of the control object 3 (i.e., a change in at least one of the position L and the mass M of the control object 3).

Referring again to FIG. 1 and FIG. 2, with respect to the position L of the control object 3, the position of the motor 2 detected by the position detecting section 13 may be input to each of the vibration component extraction filters 21a and 21b as indicated by a dashed arrow, or the position command generated by the position command section 10 may be input to each of the vibration component extraction filters 21a and 21b. On the other hand, the mass M of the control object 3 may be input in advance to the motor control device 1 by an operator, or may be estimated from the relationship between a torque and an acceleration of the control object 3 or the motor 2 by operating (e.g., vibrating) the motor 2 minutely.

Figure 5:
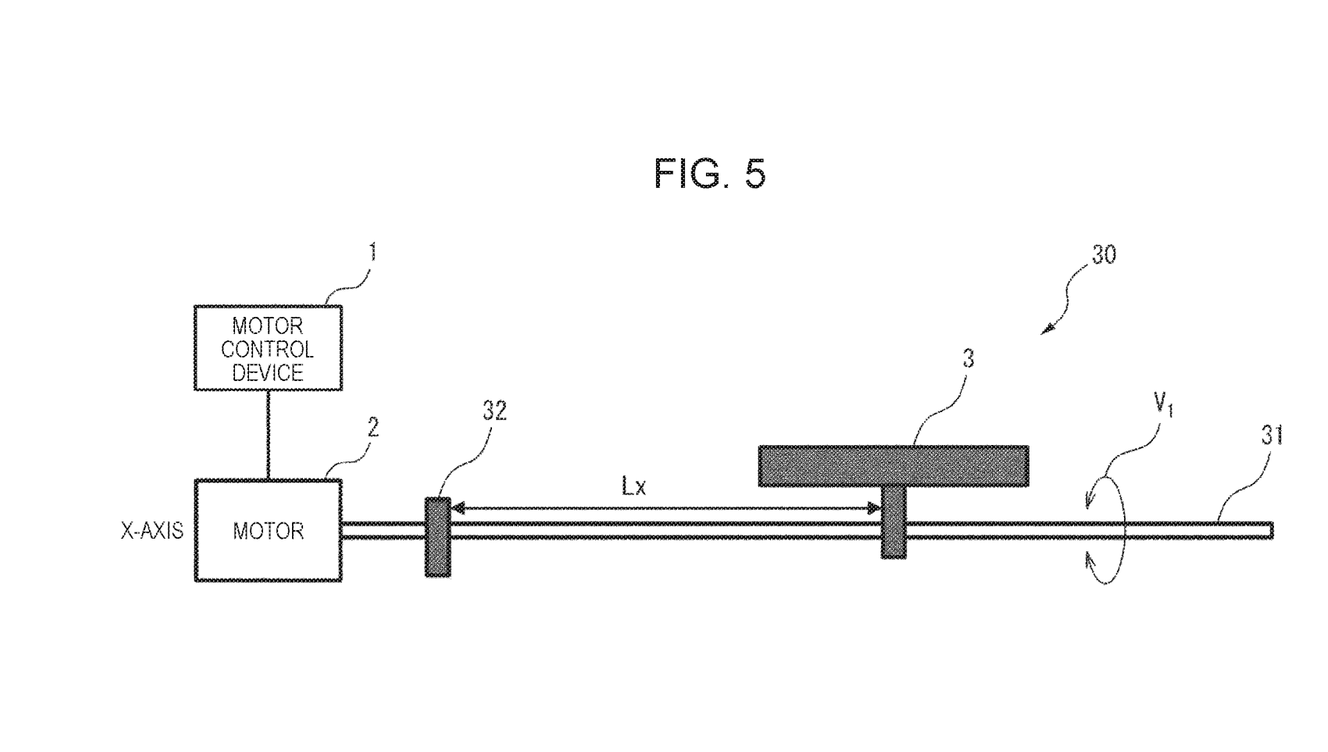
FIG. 5 is a configuration diagram of an industrial machine with its own shaft driven by a motor.

FIG. 5 illustrates an industrial machine 30 provided with its own shaft 31 driven by the motor 2. The industrial machine 30 includes the motor 2, the own shaft 31 driven by the motor 2, the control object 3 movable by the own shaft 31, and the motor control device 1 that controls the motor 2. The motor 2 is, for example, a servo motor, the own shaft 31 is, for example, an X-axis ball screw that defines the X-axis direction, and the control object 3 is, for example, a table. The own shaft 31 is supported by the support element 32 in a cantilever manner, but may be supported by both ends.

The motor control device 1 includes the vibration component extraction filter 21a or 21b illustrated in FIG. 1 or FIG. 2. The own shaft 31 generates the torsional vibration $V_1$, and the torsional vibration characteristic changes according to a position Lx of the control object 3 in the X-axis direction. Therefore, each of the vibration component extraction filters 21a and 21b obtains the angular frequency $\omega_1$ of the torsional vibration $V_1$ from the equation 2 based on the position Lx of the control object 3 on the own shaft 31, and changes the filter characteristic frequency $\omega_0$ based on the obtained angular frequency $\omega_1$. Then, each of the vibration component extraction filters 21a and 21b extracts the acceleration F (a) including the torsional vibration component based on the changed filter characteristic frequency $\omega_0$.

Figure 6:
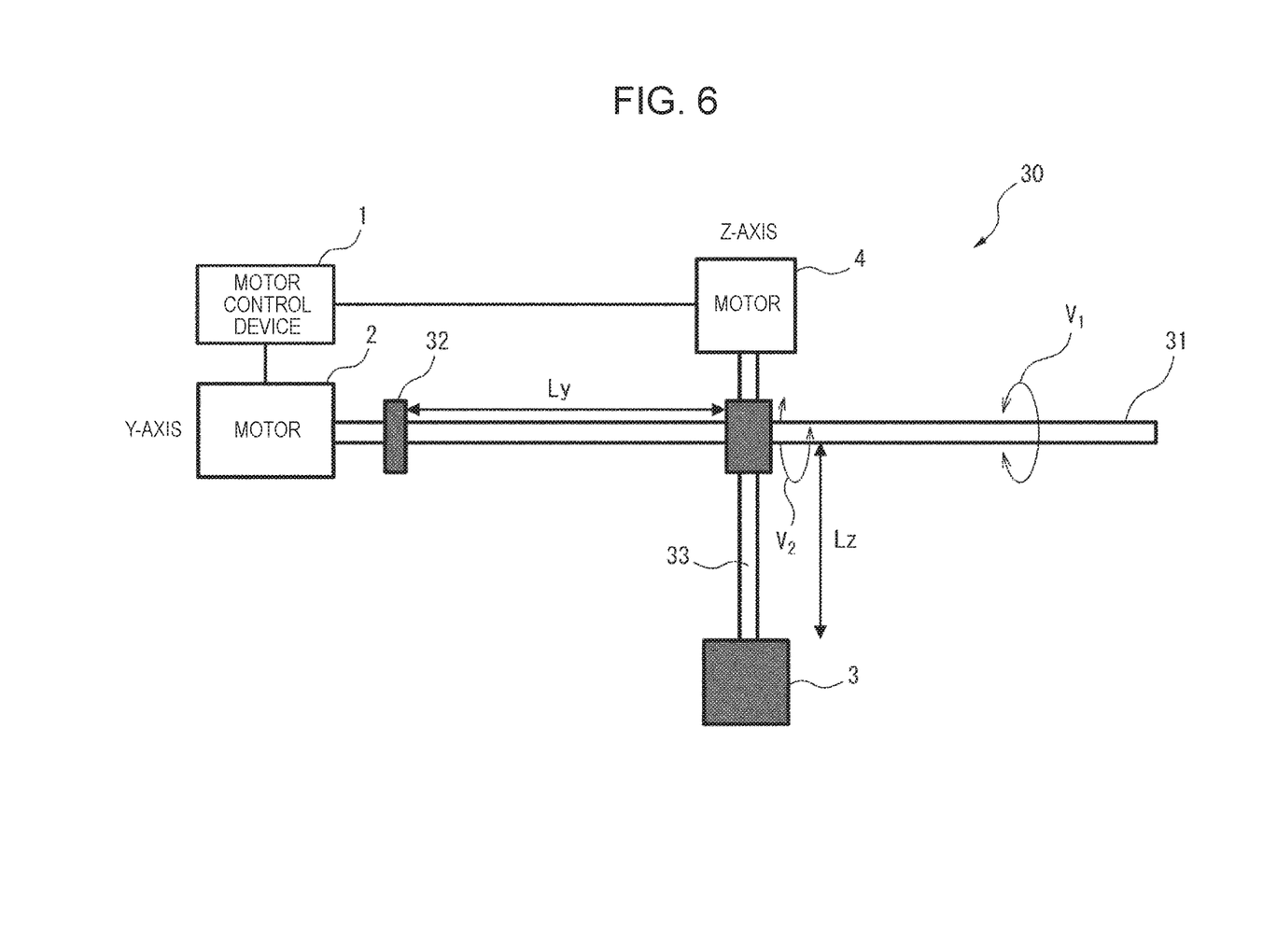
FIG. 6 is a configuration diagram of an industrial machine with also another shaft driven by a motor different from the above-described motor.

FIG. 6 illustrates an industrial machine 30 also provided with another shaft 33 driven by a motor 4 different from the motor 2. The industrial machine 30 includes the motor 2, the own shaft 31, the other shaft 33, the control object 3 movable by at least one of the own shaft 31 and the other shaft 33, and the motor control device 1 that controls the motor 2 and the motor 4. The own shaft 31 is, for example, a Y-axis ball screw that defines the Y-axis direction, the other shaft 33 is, for example, a Z-axis ball screw that defines the Z-axis direction, and the control object 3 is, for example, a main spindle head. The own shaft 31 is supported in a cantilever manner by the support element 32, but may be supported by both ends, and the other shaft 33 is supported in a cantilever manner.

The motor control device 1 includes the vibration component extraction filter 21a or 21b illustrated in FIG. 1 or FIG. 2. It is preferable that each of the vibration component extraction filters 21a and 21b of the present example includes at least two filters (hereinafter referred to as "torsional vibration characteristic filter" and "plate spring vibration characteristic filter") in which a low-pass filter, a band-pass filter, or the like are arranged in parallel, and an adder that adds acceleration including vibration components extracted by the two filters. The own shaft 31 generates a torsional vibration $V_1$, and the torsional vibration characteristic changes according to a position Ly of the control object 3 in the Y-axis direction. The other shaft 33 generates a plate spring vibration $V_2$, and the plate spring vibration characteristic changes according to a position Lz of the control object 3 in the Z-axis direction. The torsional vibration characteristic filter obtains the angular frequency $\omega_1$ of the torsional vibration $V_1$ from the equation 2 according to the position Ly of the control object 3 on the own shaft 31, and changes the filter characteristic frequency $\omega_0$ based on the obtained angular frequency co. Then, the torsional vibration characteristic filter extracts the acceleration $F_1$ (a) including the torsional vibration component based on the changed filter characteristic frequency $\omega_0$.

Further, the plate spring vibration characteristic filter obtains the angular frequency $\omega_2$ of the plate spring vibration $V_2$ from equation 5 according to the position Lz of the control object 3 on the other shaft 33, and changes the filter characteristic frequency $\omega_0$ based on the obtained angular frequency $\omega_2$. Then, the plate spring vibration characteristic filter extracts the acceleration $F_2$ (a) including the plate spring vibration component based on the changed filter characteristic frequency $\omega_0$. The adder adds the acceleration $F_1$ (a) including the torsional vibration component and the acceleration $F_2$ (a) including the plate spring vibration component. Thus, each of the vibration component extraction filters 21a and 21b extracts the acceleration F (a) including the torsional vibration component and the plate spring vibration component.

According to the above-described embodiment, each of the vibration component extraction filters 21a and 21b is changed in accordance with the physical change of the control object 3 (i.e., change in the position and the mass of the control object), so that the vibration suppression function can be adapted to a change in the vibration characteristic more quickly and more accurately.

Further, the program executed by the above-described processor may be provided by being recorded on a non-transitory recording medium readable by a computer, such as a CD-ROM.

Although various embodiments have been described herein, it should be recognized that the present invention is not limited to the above-described embodiments and various changes can be made within the scope described in the following claims.

The invention claimed is:

1. A motor control device comprising:
an acceleration detecting section configured to detect an acceleration of a control object driven along a shaft that is supported on at least one end of the shaft by a supporting element; and
an acceleration control section configured to control an acceleration of a motor driving the control object along the shaft based on the detected acceleration; wherein
the acceleration control section includes a vibration component extraction filter configured to extract a vibration component generated between the motor and the control object on the basis of the detected acceleration, and
the vibration component extraction filter computes and changes a filter characteristic frequency according to a plate spring vibration characteristic of the shaft computed based on an elasticity of the shaft and a position of the control object relative to the supporting element, and a mass of the control object.

2. The motor control device of claim 1, wherein the position of the control object is a position of the control object the shaft driven by the motor or a position of the control object on another shaft driven by a motor different from the motor.

3. The motor control device of claim 1, wherein a weight of the control object is input by an operator in advance, or is estimated based on a relationship between a torque and an acceleration of the control object or the motor.

4. The motor control device of claim 1, wherein the filter characteristic frequency is changed based on at least one of a torsional vibration characteristic and a plate spring vibration characteristic.

5. The motor control device of claim 4, wherein the torsional vibration characteristic is represented by the following equation $$\omega_1 = \sqrt{k_1/J_L}$$

based on a spring constant $k_1$ that changes according to the position of the control object, an inertia $J_L$ of the control object, and an angular frequency $\omega_1$ of the control object.

6. The motor control device of claim 4, wherein the plate spring vibration characteristic is represented by the following equation $$\omega_2 = \sqrt{k_2/M}$$

based on a spring constant $k_2$ that changes according to the position of the control object, a mass M of the control object, and an angular frequency $\omega_2$ of the control object.

7. The motor control device of claim 1, wherein the vibration component extraction filter is at least one of a low-pass filter and a band-pass filter, and the filter characteristic frequency is a cut-off frequency in the low-pass filter, or a center frequency or an upper cut-off frequency and a lower cut-off frequency in the band-pass filter.

8. The motor control device of claim 1, wherein the vibration component extraction filter is a filter provided downstream from the acceleration detecting section.

9. The motor control device of claim 1, wherein the acceleration control section further includes an acceleration controller configured to control an acceleration of the motor, and the vibration component extraction filter is a filter provided upstream or downstream from the acceleration controller.

10. An industrial machine comprising:
a motor;
a shaft driven by the motor;
a control object movable by the shaft;
an acceleration detecting section configured to detect an acceleration of the control object driven along the shaft that is supported on at least one end of the shaft by a supporting element; and
an acceleration control section configured to control an acceleration of the motor driving the control object along the shaft based on the detected acceleration; wherein
the acceleration control section includes a vibration component extraction filter configured to extract a vibration component generated between the motor and the control object on the basis of the detected acceleration, and
the vibration component extraction filter computes and changes a filter characteristic frequency according to a plate spring vibration characteristic of the shaft computed based on an elasticity of the shaft and a position of the control object relative to the supporting element, and a mass of the control object.

11. An industrial machine comprising:
a motor;
a shaft driven by the motor;
another shaft driven by a motor different from the motor;
a control object movable by at least one of the shaft and the other shaft;
an acceleration detecting section configured to detect an acceleration of the control object driven along the at least one of the shaft and the other shaft that is supported on at least one end of the at least one of the shaft and the other shaft by a supporting element; and
an acceleration control section configured to control an acceleration of at least one of the motors driving the control object along the at least one of the shaft and the other shaft based on the detected acceleration; wherein
the acceleration control section includes a vibration component extraction filter configured to extract a vibration component generated between at least one of the motors and the control object on the basis of the detected acceleration, and
the vibration component extraction filter computes and changes a filter characteristic frequency according to a plate spring vibration characteristic of the at least one of the shaft and the other shaft computed based on an elasticity of the at least one of the shaft and the other shaft and a position of the control object relative to the supporting element, and a mass of the control object.

* * * * *